(12) United States Patent
Kharvandikar et al.

(10) Patent No.: US 7,447,184 B1
(45) Date of Patent: Nov. 4, 2008

(54) METHOD AND SYSTEM FOR DETECTING MASQUERADING WIRELESS DEVICES IN LOCAL AREA COMPUTER NETWORKS

(75) Inventors: Shrinivas Kharvandikar, Mumbai (IN); Pravin Bhagwat, Kendall Park, NJ (US)

(73) Assignee: AirTight Networks, Inc., Mountain View, CA (US)

( * ) Notice: Subject to any disclaimer, the term of this patent is extended or adjusted under 35 U.S.C. 154(b) by 777 days.

(21) Appl. No.: 10/993,943

(22) Filed: Nov. 19, 2004

Related U.S. Application Data

(60) Provisional application No. 60/607,812, filed on Sep. 8, 2004.

(51) Int. Cl.
*H04Q 7/24* (2006.01)
(52) U.S. Cl. ...................................... 370/338
(58) Field of Classification Search .................. 370/338
See application file for complete search history.

(56) References Cited

U.S. PATENT DOCUMENTS

| | | | |
|---|---|---|---|
| 7,110,756 B2 * | 9/2006 | Diener | 455/423 |
| 7,286,515 B2 * | 10/2007 | Olson et al. | 370/338 |
| 7,302,269 B1 * | 11/2007 | Crawford et al. | 455/456.1 |
| 7,307,980 B1 * | 12/2007 | Shah | 370/352 |

2003/0185244 A1   10/2003   Wu et al.

OTHER PUBLICATIONS

Source code of a wireless monitoring tool available on the internet, http://svn.kismetwireless.net/code/tags/kismet-2004-10-R1/ CHANGELOG, Jun. 9, 2004, 2 pgs.
Bellovin: "A Technique For Counting NATted Hosts", AT&T Labs Research, IMW02, Nov. 6-8, 2002, Marseille France, Copyright 2002, pp. 267-272.
Wright: "Detecting Wireless LAN MAC Address Spoofing", Jan. 21, 2003, Copyright 2003, Joshua Wright.
Brian Moran, The hacker's wireless toolbox: part 2, Computerworld, alleged Jul. 17, 2003, http://www.computerworld.com/mobiletopics/mobile/story/0,10801,83152,00.html.

* cited by examiner

*Primary Examiner*—Vincent P Harper
*Assistant Examiner*—Gary Au
(74) *Attorney, Agent, or Firm*—AirTight Networks; Hemant M. Chaskar

(57) ABSTRACT

Methods and systems for detecting a masquerading wireless device in a local area network are provided. The method includes receiving a first packet and a second packet. Preferably, the first packet includes a first identity information and a first time information, and the second packet includes a second identity information and a second time information. The method can compute, using the first time information, a first approximation to a starting time of a wireless device associated with the first identity information. The method can also compute, using the second time information, a second approximation to a starting time of a wireless device associated with the second identity information. The method further includes determining whether a masquerading wireless device is present in the local area network based on at least the first and second approximations.

12 Claims, 6 Drawing Sheets

METHOD AND SYSTEM FOR DETECTING MASQUERADING WIRELESS DEVICES IN LOCAL AREA COMPUTER NETWORKS

CROSS-REFERENCES TO RELATED APPLICATIONS

This present application claims priority to the U.S. Provisional Application No. 60/607,812, titled "Method and system for detecting masquerading wireless devices in local area computer networks", filed on Sep. 8, 2004; commonly assigned, and hereby incorporated by reference for all purposes.

BACKGROUND OF THE INVENTION

1. Field of the Invention

The present invention relates generally to wireless computer networking techniques. More particularly, the invention provides methods and systems for intrusion detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others.

2. Description of the Related Art

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic area (e.g. an office, building floor, building, home, or any other defined geographic region (indoor and/or outdoor)) are typically interconnected using a Local Area Network (LAN) (e.g. the Ethernet). The LANs, in turn, can be interconnected with each other using a Wide Area Network (WAN) (e.g. the Internet). A conventional LAN can be deployed using an Ethernet-based infrastructure comprising cables, hubs switches, and other elements.

Connection ports (e.g. Ethernet ports) can be used to couple multiple computer systems to the LAN. For example, a user can connect to the LAN by physically attaching a computing device (e.g. a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g. file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. The IEEE 802.11 family of standards (WiFi) is a common standard for such wireless communication. In WiFi, the 802.11b standard provides for wireless connectivity at speeds up to 11 Mbps in the 2.4 GHz radio frequency spectrum; the 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP.

In the past, security of the computer network has focused on controlling access to the physical space where the LAN connection ports are located. The application of wireless communication to computer networking can introduce additional security exposure. Specifically, the radio waves that are integral to wireless communication often cannot be contained in the physical space bounded by physical structures, such as the walls of a building.

Hence, wireless signals often "spill" outside the area of interest. Because of this spillage, unauthorized users, who could be using their stations in a nearby street, parking lot, or building, could wirelessly connect to the AP and thus gain access to the LAN. Consequently, providing conventional security by controlling physical access to the connection ports of the LAN would be inadequate.

To prevent unauthorized access to the LAN over WiFi, the AP can employ certain techniques. For example, in accordance with 802.11, a user is currently requested to carry out an authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, and 802.11i based authentication. The AP can provide additional security measures such as encryption and firewalls.

Despite these measures, security risks still exist. For example, an unauthorized AP may connect to the LAN and then, in turn, allow unauthorized users to connect to the LAN. These unauthorized users can thereby access proprietary/trade secret information on computer systems connected to the LAN without the knowledge of the owner of the LAN. Notably, an unauthorized AP can easily masquerade as an authorized AP. That is, an unauthorized AP can advertise the same feature set (e.g. MAC address and other settings) as an authorized AP (a type of security attack generically called "MAC spoofing"), thereby making its detection difficult.

Moreover, even if an unauthorized AP is not LAN-connected, it may still pose a security threat. Specifically, authorized clients in communication with the unauthorized AP may be unwittingly providing proprietary/trade secret information to the unauthorized AP. Therefore, a need arises for a system and technique that improves security for LAN environments.

Prior solutions have attempted to provide mechanisms to detect unauthorized or counterfeit APs. One conventional technique is provided in the IEEE 802.11 wireless LAN standard. According to this technique, the APs are required to advertise SSID (service set identifier) in their beacon packets. Preferably, the SSID is a string of characters and/or numerals that is not easy to guess and known only to legitimate wireless devices in a selected communication group (e.g. wireless devices in the office or in the department in the office). The wireless stations receive these beacon packets and analyze them to check if the value contained in the SSID field is the legitimate one. If so, the corresponding AP is regarded as authorized, if not it is regarded as unauthorized or counterfeit.

In a similar manner, other parameters in the beacon packets can also be analyzed (e.g. compared with legitimate values) to detect unauthorized or counterfeit APs. These parameters can include, but not limited to, source MAC address, BSSID, supported data rates, parameters for the contention and contention-free access to the wireless medium, QoS parameters, security parameters, information elements (IEs), and capability parameters. However, these techniques may not be able to detect MAC spoofing counterfeit APs, as these APs can advertise the exact same feature set as that of authorized APs in their beacon packets.

Another conventional technique to detect unauthorized APs performing MAC spoofing computes the rate of beacon packets (i.e., beacon packets per unit time) transmitted in the wireless medium from a specified MAC address (e.g. as found in the source address or BSSID field of the beacon packet). The computed rate is then compared with the beacon packet rate specified in the beacon packet itself (e.g. in the "beacon interval" field of the beacon packet). If the computed rate is different from the specified rate, MAC spoofing is inferred. There are several limitations of this technique. One limitation is that it requires a significant fraction of the total beacon packets transmitted in the wireless medium from a specified MAC address to be captured by a sensor device used to detect MAC spoofing. Otherwise, the computed beacon packet rate may not accurately reflect the true rate of beacon packets transmitted in the wireless medium. However, the sensor device often scans multiple radio channels, one at a time, and thus can often miss many of the beacon packets transmitted on a specific radio channel. Other limitations of this conventional technique are described in further detail throughout the present specification and more particularly below.

Yet another conventional technique to detect MAC spoofing is based on the examination of sequence numbers in the beacon packets. This is much like the conventional technique described by Steven Bellovin of AT&T Labs Research in a paper titled "A Technique for Counting NATed Hosts" at Internet Measurement Workshop (IMW) in November 2002 for counting the number of independent devices contributing to the total observed packet stream. This technique compares the sequence number in the beacon packet captured by a sensor device to the sequence number of the previously captured beacon packet. If the current and the previous sequence numbers are not sequential, MAC spoofing (i.e., presence of multiple independent devices contributing to the total observed beacon packet stream) is inferred. There are several limitations of this technique. One limitation results from the fact that there are often gaps in the sequence numbers in the consecutive beacon packets transmitted by a given AP. This is due to the transmission of data packets (each of which causes the sequence number to be incremented by 1) from the AP between the transmission of successive beacon packets. These gaps in the sequence numbers make the above technique difficult to implement and unreliable. These and other limitations of conventional techniques are described in further detail throughout the present specification and more particularly below.

From the above, techniques for improving security in wireless networks, and in particular the ability to detect MAC spoofing, are highly desired.

SUMMARY OF THE INVENTION

According to the present invention, techniques related to wireless computer networking are provided. More particularly, the invention provides methods and systems for intrusion detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others. In a specific embodiment, the present invention provides for detecting MAC spoofing.

The application of wireless communication to computer networking has introduced significant security risks. For example, the radio waves that are integral to wireless communication can "spill" outside a region within which local area computer network is operated (e.g. office space, building etc.). Unfortunately, unauthorized wireless devices can detect this "spillage". Additionally, unauthorized wireless devices can surreptitiously operate within the local area network. These devices can pose serious security threats to the network due to their signal spillage. The unauthorized wireless devices can further masquerade as authorized wireless devices thereby making their detection difficult. Therefore, as computer networks with wireless extensions become more ubiquitous, users are increasingly concerned about unauthorized wireless devices, whether within or outside the region of operation of the local area network.

In accordance with one aspect of the invention, a method for detecting a masquerading wireless device in a local area network is provided. The method includes receiving a first packet and a second packet. Preferably, the first packet includes a first identity information and a first time information, and the second packet includes a second identity information and a second time information. The method can compute, using the first time information, a first approximation to a starting time of a wireless device associated with the first identity information. The method can also compute, using the second time information, a second approximation to a starting time of a wireless device associated with the second identity information. The method further includes determining whether a masquerading wireless device is present in the local area network based on at least the first and second approximations.

According to another aspect of the invention, a method for detecting a masquerading event in a local area network (LAN) is provided. The method includes detecting packets transmitted in the LAN. The method also includes determining identity information associated with the packets. Preferably, each identity information identifies a wireless device. The method can determine, using wireless device specific signatures associated with the packets, whether wireless devices having identical identity information represent a single physical wireless device. In one embodiment, a wireless device specific signature can include one or more values of one or more selected fields in the detected packets or information derived thereof. In one specific embodiment, a wireless device specific signature includes a time stamp field (TSF) value in the packet or information derived thereof. The wireless device specific signature can be provided in the packet by hardware, firmware or software of the wireless device. In one embodiment, presence of more than one physical wireless devices having identical identity information is inferred if the magnitude of a difference between the TSF values in two packets including the same identity information is different from the magnitude of a difference between the time instants when the two packets were detected. In an alternative embodiment, approximations to starting times of wireless devices are computed using the TSF values and presence of more than one physical wireless device having identical identity information is inferred if at least two approximations computed using the TSF values in packets including the same identity information are different from each other.

Certain advantages and/or benefits may be achieved using the present invention. For example, the present technique provides an easy to use process that relies upon conventional computer hardware and software technologies. In some embodiments, the present technique can detect MAC spoofing even if only a few beacon packets from a specific MAC address are captured by the sensor device. Notably, the present technique does not constrain the radio channel scanning pattern of the sensor device in a specific way as the time interval between the captured beacon packets can be arbitrary. In other embodiments, the present technique can intelligently distinguish between the authorized AP device undergoing a reset/restart/reboot operation (which can often cause false positives in the conventional techniques) and the actual MAC spoofing event. In some embodiments, the present technique provides for distributed operation, i.e., using plurality of sensor devices. The distributed operation can advantageously detect certain MAC spoofing events that may not be detected by a lone sensor device.

Depending upon the embodiment, one or more of these benefits may be achieved. These and other benefits will be described in more throughout the present specification and more particularly below.

DETAILED DESCRIPTION OF THE INVENTION

Figure 1:
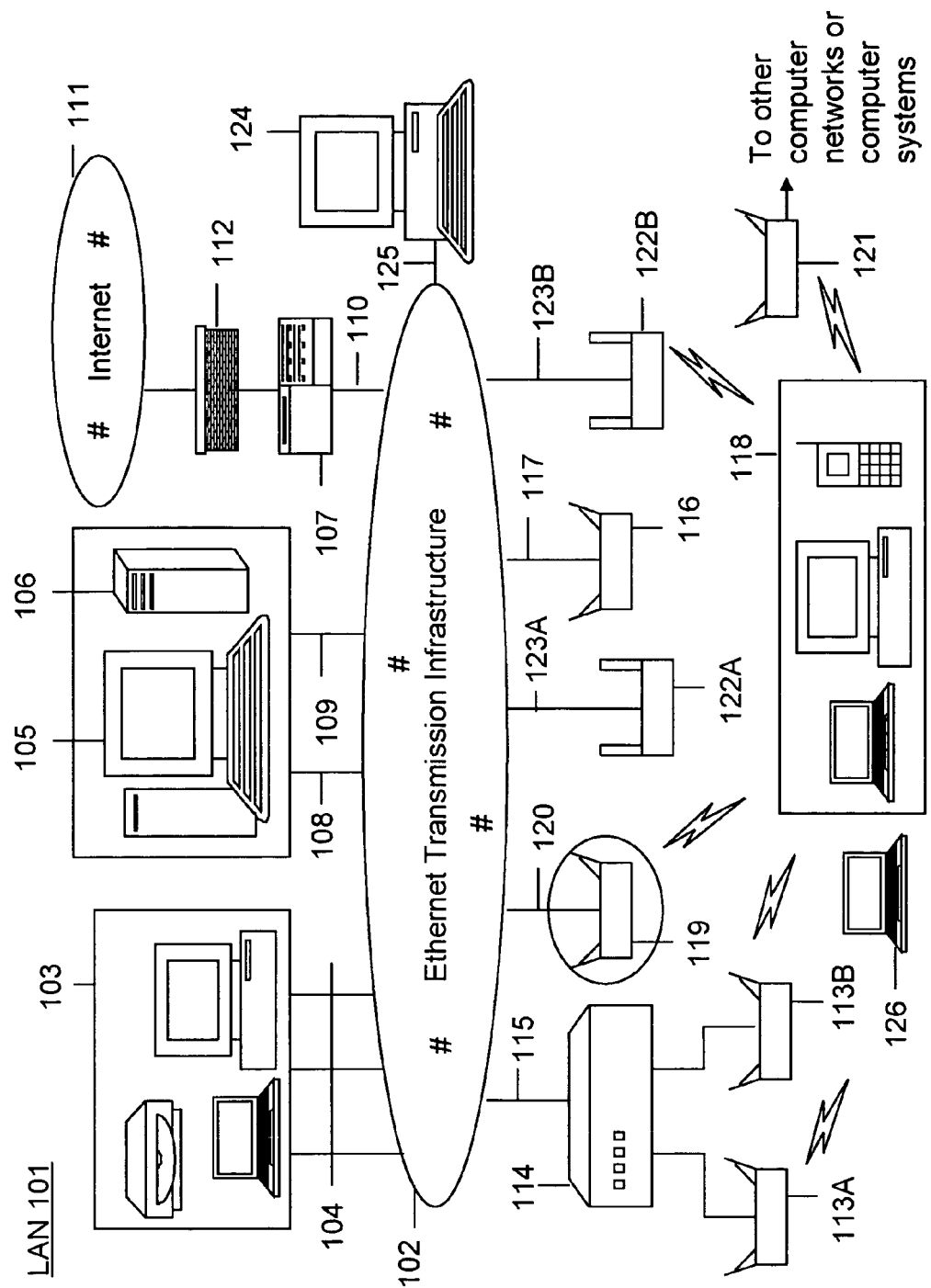
FIG. 1 illustrates a simplified LAN architecture that can facilitate intrusion detection according to an embodiment of the present invention.

According to the present invention, techniques related to wireless computer networking are provided. More particularly, the invention provides methods and systems for intrusion detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others. In a specific embodiment, the invention provides for detecting MAC spoofing.

Conventional security of a computer network has focused on controlling access to the physical space where the local area network (LAN) connection ports are located. The application of wireless communication to computer networking has introduced new security risks. Specifically, the radio waves that are integral to wireless communication often cannot be contained within the physical boundaries of the region of operation of a local area network (e.g. an office space or a building). This "spillage" can be detected by unauthorized wireless devices outside the region of operation. Additionally, unauthorized wireless devices can be operating within the local area network, and can even be connected to the local area network. The radio coverage of such devices that spills outside the region of operation can be used by devices outside the region to gain unauthorized access to the local area network. The unauthorized wireless devices can further masquerade as authorized wireless devices (e.g. perform "MAC spoofing") thereby making their detection difficult. As computer networks with wireless extensions become more ubiquitous, users are increasingly concerned about unauthorized wireless devices, whether within or outside the region of operation of the local area network.

The conventional techniques for detecting MAC spoofing can often generate false positives about MAC spoofing. False positives create nuisance. They also prohibit automated intrusion prevention, i.e., automatically disabling the suspicious device (e.g. by transmitting interference signal) in response to a MAC spoofing alert. For example, in one conventional technique based on packet sequence number analysis, a false positive about MAC spoofing can occur when an authorized AP device undergoes a reset/restart/reboot operation causing the restart of its sequence number counter (e.g. from 0). This will cause the sequence numbers in the packets observed by the sensor device to be non-sequential. Consequently a false positive regarding MAC spoofing can occur with this technique.

Another limitation of conventional techniques is that they often fail to operate in distributed environment, i.e., when more than one sensor devices are used to monitor the wireless network. This is often the case with large facilities which cannot be covered by a single sensor device. For example, suppose that there is an authorized AP located in the intersection of the radio coverage of the two sensor devices, and that there is no MAC spoofing unauthorized AP present at all. Then, in the conventional technique based on beacon packet rate analysis, the combined rate of beacon packets from the MAC address of the authorized AP captured by two sensor devices will be almost twice the stipulated beacon packet rate in the beacon itself and a false positive will be generated. Also this conventional technique cannot distinguish this case from the one in which an authorized AP is visible to one sensor and the MAC spoofing unauthorized AP is visible to another sensor, but none of the sensors can detect beacon packets from both of these APs. These and other limitations make the conventional technique unusable in practice.

Various methods and systems for overcoming certain limitations of conventional MAC spoofing detection techniques can be found throughout the present specification and more particularly below.

FIG. 1 illustrates a simplified local area network (LAN) 101 that can facilitate intrusion detection according to an embodiment of the present invention. This diagram is merely an example, which should not unduly limit the scope of the claims herein. One of ordinary skill in the art would recognize many variations, modifications, and alternatives. In LAN 101, a core transmission infrastructure 102 can include various transmission components, e.g. Ethernet cables, hubs, and switches. In a typical deployment, the core transmission infrastructure 102 comprises one or more network segments. According to one embodiment, a network segment refers to an IP "subnetwork" (called "subnet"). Each subnet is identified by a network number (e.g. IP number and subnet mask) and plurality of subnets are interconnected using router devices. Notably, the plurality of subnets of the LAN 101 can be geographically distributed (e.g. in offices of a company in different geographic locations). The geographically distributed segments are interconnected via virtual private network (VPN).

One or more connection ports (e.g. Ethernet sockets) are provided on each of the segments for connecting various computer systems to the LAN 101. Thus, one or more end user devices 103 (such as desktop computers, notebook computers, telemetry sensors etc.) can be connected to LAN 101 via one or more connection ports 104 using wires (e.g. Ethernet cables) or other suitable connection means.

Other computer systems that provide specific functionalities and services can also be connected to LAN 101. For example, one or more database computers 105 (e.g. computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g. procedures for authentication, encryption, QoS, mobility, firewall etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g. UWB, WiMax, Bluetooth, etc.) can be used to provide the wireless protocols.

As shown in FIG. 1, an unauthorized AP 119 can also be connected to LAN 101 using a connection port 120. Merely as an example, unauthorized AP 119 could be a rogue AP device or a soft AP. A rogue AP device refers to an AP operated by a person having physical access to the facility and connected to LAN 101 without the permission of a network administrator. A soft AP typically refers to a WiFi-enabled computer system connected to a connection port, but also functioning as an AP under the control of software. The software can be either deliberately run on the computer system or inadvertently run in the form of a virus program. Other types of unauthorized APs such as misconfigured APs and like may also be present. Notably, the unauthorized APs create unauthorized wireless connection points on the LAN.

Unauthorized AP 119 may pose any number of security risks. For example, unauthorized AP 119 may not employ the right security policies or may bypass security policy enforcing elements, e.g. switch 114. Moreover, an intruder, such as unauthorized station 126 can connect to LAN 101 and launch attacks through unauthorized AP 119 (e.g. using the radio signal spillage of unauthorized AP outside the defined geographic region). In one embodiment, unauthorized AP 119 may perform MAC spoofing, thereby making its detection difficult. For example, the AP 119 can advertise the same feature set (MAC address and other parameters) as the authorized AP (e.g. AP 113A, 113B or 116) in its beacon packets.

FIG. 1 also shows another unauthorized AP 121 whose radio coverage spills into the region of operation the concerned LAN. According to a specific embodiment, the AP 121 can be an AP in the neighboring office that is connected or unconnected to the neighbor's LAN, an AP on the premises of LAN 101 that is not connected to the LAN 101 and other APs, which co-exist with the LAN and share the airspace without any significant and/or harmful interferences. According to another specific embodiment, the AP 121 can be hostile AP. Notably, even though not connected to LAN 101, unauthorized AP 121 may lure authorized stations into communicating with it, thereby compromising their security. The hostile AP may lure authorized wireless stations into connecting to it and launch man-in-the-middle, denial of service, and other kinds of disruptive attacks. Further, the unauthorized AP 121 can resort to MAC spoofing to evade detection. For example, the unauthorized AP 121 can masquerade as the authorized AP 113A, 113B or 116 by advertising the same feature set, e.g. MAC address and other beacon parameters, as one of the authorized APs.

In accordance with one aspect of the invention, an intrusion detection system can protect LAN 101 from any type of unauthorized user (i.e., unauthorized AP or unauthorized station). The intrusion detection system can include one or more RF sensor/detection devices (e.g. sensor devices 122A and 122B, each generically referenced herein as a sniffer 122) disposed within or in a vicinity of a selected geographic region comprising LAN 101. In one embodiment (shown in FIG. 1), sniffer 122 can be connected to LAN 101 via a connection port (e.g. connection port 123A/123B). In another embodiment, sniffer 122 can be connected to LAN 101 using a wireless connection.

A sniffer 122 is able to monitor wireless activity in a subset of the selected geographic region. Wireless activity can include any transmission of control, management, or data packets between an AP and one or more wireless stations, or among one or more wireless stations. Wireless activity can even include communication for establishing a wireless connection between an AP and a wireless station (called "association").

In general, sniffer 122 can listen to a radio channel and capture transmissions on that channel. In one embodiment, sniffer 122 can cycle through multiple radio channels on which wireless communication could take place. On each radio channel, sniffer 122 can wait and listen for any ongoing transmission. In one embodiment, sniffer 122 can operate on multiple radio channels simultaneously.

Whenever a transmission is detected, sniffer 122 can collect and record the relevant information about that transmission. This information can include all or a subset of information gathered from various fields in a captured packet. In one embodiment, sniffer 122 captures a beacon packet from an AP. In an alternative embodiment, sniffer 122 captures a probe response packet from an AP. The sniffer records information provided in various fields of the captured beacon packet or probe response packet. In a specific embodiment, the sniffer records values in the source MAC address field and the TSF (Time Stamp Field) of the beacon/probe response packet. In yet another embodiment, a receive signal strength indicator (RSSI) associated with the captured packet can also be recorded. Other information such as the day and the time the transmission was detected can also be recorded. In one embodiment, sniffer 122 can be any suitable receiving device capable of detecting wireless activity.

In one embodiment, sniffer 122 can be built using a hardware platform similar to that used to build an AP, although having different functionality and software. In one embodiment, to more unobtrusively be incorporated in the defined geographic region, sniffer 122 could have a small form factor. In one embodiment, a sniffer 122 could also be provided with radio transmit interface, thereby allowing sniffer 122 to generate interference with a suspected intruder's transmission. The radio transmit interface could also be used by the sniffer 122 for active probing which involves transmission of test signals.

A sniffer 122 can be spatially disposed at an appropriate location in the selected geographic region by using heuristics, strategy, and/or calculated guesses. In accordance with one aspect of the invention, an RF (radio frequency) planning tool can be used to determine an optimal deployment location for sniffer 122.

Server 124 (also called "security appliance") can be coupled to LAN 101 using a connection port 125. In one embodiment, each sniffer 122 can convey its information about detected wireless activity to server 124 (i.e., over one or more computer networks). Server 124 can then analyze that information, store the results of that analysis, and process the results. In another embodiment, sniffer 122 may filter and/or summarize its information before conveying it to server 124.

Sniffer 122 can also advantageously receive configuration information from server 124. This configuration information can include, for example, the operating system software code, the operation parameters (e.g. frequency spectrum and radio channels to be scanned), the types of wireless activities to be detected, and the identity information associated with any authorized wireless device. Sniffer 122 may also receive specific instructions from server 124, e.g. tuning to specific radio channel or detecting transmission of specific packet on a radio channel.

According to a specific embodiment, the present invention provides a method for detecting MAC spoofing in local area networks of computing devices. In one embodiment, this method can be implemented using one or more sniffers 122. In an alternative embodiment, this method can be implemented using one or more sniffers 122 and one or more security appliances 124. The method works by capturing beacon packets or probe response packets transmitted from a given MAC address (e.g. MAC address as provided in the source address or the BSSID field in the beacon packet), and recording values contained in the TSF of the captured beacon packets. The TSF is a 64-bit field in the IEEE 802.11 beacon packet that contains an AP's timestamp. The TSF value represents value in microseconds and increments as the time progresses, for example, by one count every one microsecond interval. The value in TSF is used by the client wireless stations to synchronize their clocks to the AP's clock. The TSF counter starts from zero every time the AP device is started, i.e., when the AP device is reset, restarted, rebooted, powered on and like. The TSF counter also starts from zero after a timer rollover occurs i.e. the count reaches the maximum allowable value. Notably, the TSF counter in the AP device is often implemented in hardware and cannot be easily tampered with.

In one embodiment, the method of present invention exploits this fact by computing an approximation to the starting time (i.e. most recent starting time) of the AP device with a given MAC address from the TSF value contained in the captured beacon packet. For example, the starting time can be computed by subtracting the TSF value from the time the beacon packet from a given MAC address is captured. If there were a plurality of AP devices transmitting beacon packets with the given MAC address, it is unlikely that they were started at exactly the same time instant. Subsequently, different values for AP starting time approximation will be obtained and MAC spoofing can be detected. Notably, probe response packets transmitted from a given MAC address can also be used to compute approximation to AP starting time as they also contain the TSF.

Figure 2:
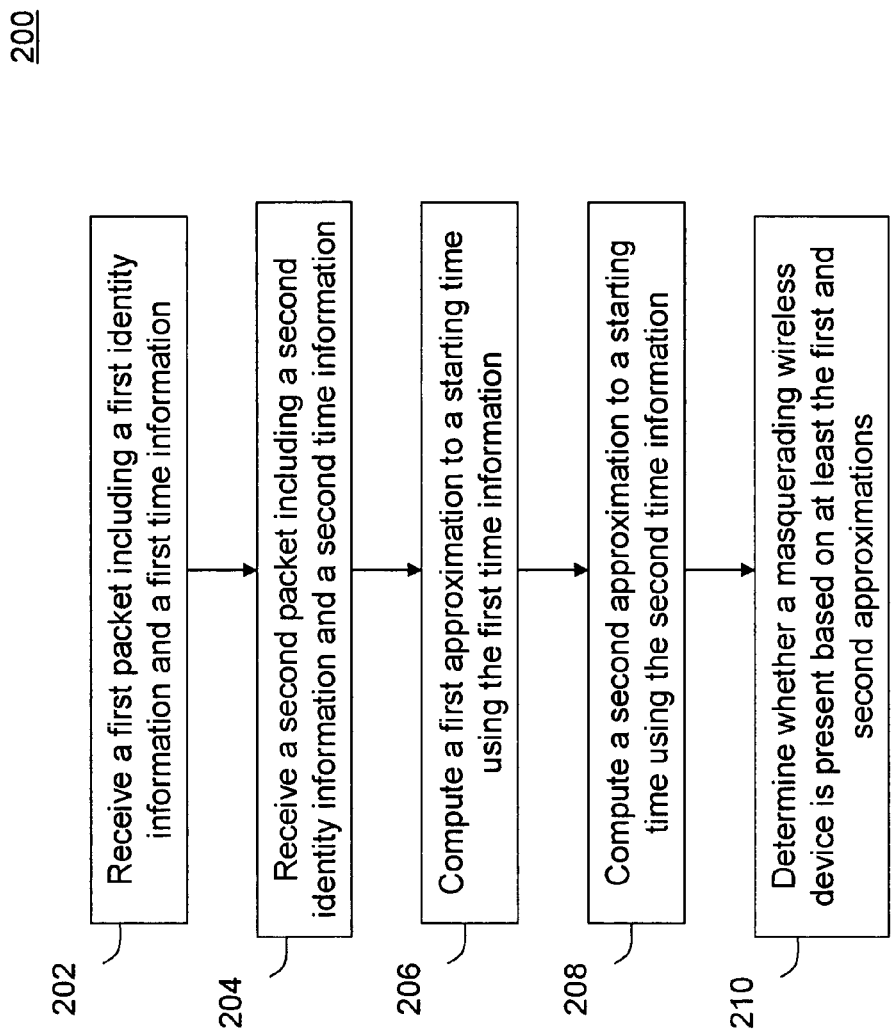
FIG. 2 illustrates a method for detecting MAC spoofing according to an embodiment of the present invention.

This method 200 is illustrated in FIG. 2. The steps in the method 200 are as follows. Step 202 can receive a first packet including a first identity information and a first time information. Step 204 can receive a second packet including a second identity information and a second time information. Preferably, the first and second packets are received using one or more sniffer devices. In one embodiment, both these packets are received using a single sniffer device. In an alternative embodiment, these two packets are received using two different sniffer devices. In one embodiment, any of the first and the second packets can include a beacon frame or a probe response frame transmitted from an access point device. A time information can include a TSF value in the beacon frame or the probe response frame, and an identity information can include a MAC address of the transmitter of the packet.

Step 206 can compute, using the first time information, a first approximation to a starting time of a wireless device associated with the first identity information. In step 208, the method can compute, using the second time information, a second approximation to a starting time of a wireless device associated with the second identity information. In one embodiment, an approximation to a starting time of a wireless device is computed by subtracting a TSF value from a time the corresponding packet is received by the sniffer.

Step 210 can determine whether a masquerading wireless device is present in the local area network based on at least the first and second approximations. In one embodiment, if the two approximation values are unequal and the first and second identity information are identical, MAC spoofing is inferred. Preferably, the two values are apart by more than a reasonable error margin (e.g. 500 millisecond or 2 seconds). For example, the error margin can account for computational inaccuracies resulting from factors such as the granularity of local clock at the sniffers, the exact instant recorded by the sniffer hardware/firmware/software as the reception times and others.

In an alternative embodiment, false positives regarding MAC spoofing occurring as a result of an authorized AP undergoing a reset/reboot/restart operation can be avoided. Notably, after the authorized AP undergoes a reset/reboot/restart operation, the TSF counter starts counting from zero. Then the value of the first approximation that is computed before this reset/reboot/restart event and the value of the second approximation that is computed after this event can be different. Thus, in this alternative embodiment, MAC spoofing is inferred if the number of times MAC spoofing is inferred in step 210 by using method 200 over a set of packets received during a selected time interval exceeds a threshold value. That is, merely as an example, the method 200 is applied to the first and the second packet, to the second and the third packet, to the third and the fourth packet received during the selected time interval and so on. As merely an example, the MAC spoofing alert is generated only if the MAC spoofing event is inferred more than once or more than five times over an interval of 1 second or 10 seconds.

In yet an alternative embodiment, if any of the first and second approximations is greater than the smaller of the reception times of the two packets, no definite inference about MAC spoofing is drawn. This is in order to eliminate the possibility of false positive regarding MAC spoofing in certain events such as resetting of an authorized AP which causes TSF counter to start counting from zero.

The above sequence of steps provides a method according to an embodiment of the present invention. As shown, the method uses a combination of steps including a way of detecting MAC spoofing. Other alternatives can also be provided where steps are added, one or more steps are removed, or one or more steps are provided in a different sequence, without departing from the scope of the claims herein.

Figure 3:
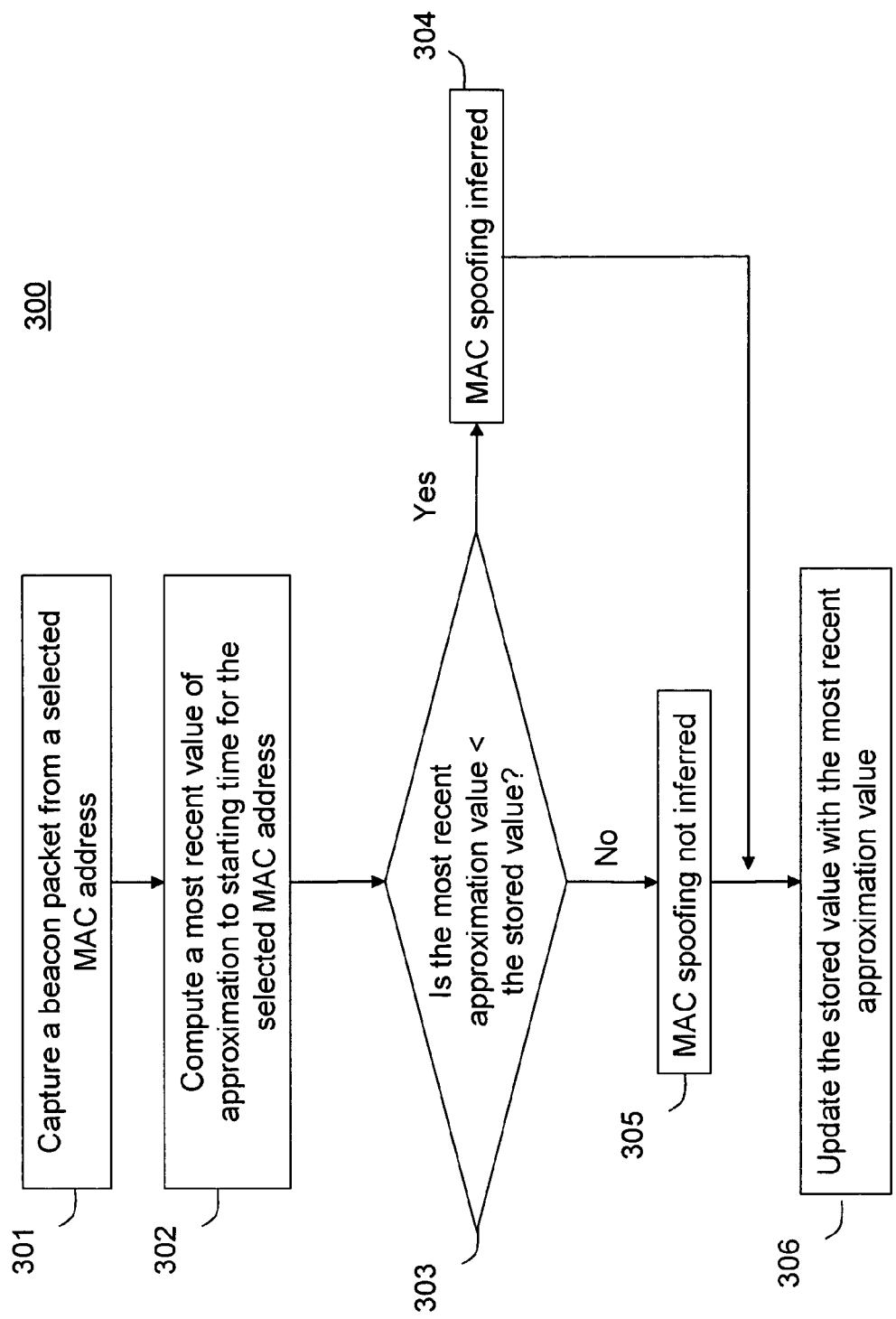
FIG. 3 illustrates a method to detect MAC spoofing according to a specific embodiment of the present invention.

A method 300 according to an alternative specific embodiment of the present invention is illustrated in FIG. 3. The method 300 advantageously eliminates false positives that could otherwise occur as a result of an authorized AP undergoing a reset/restart/reboot operation. Notably, this method also eliminates false positives that could otherwise occur due to rollover of the TSF counter. The steps in method 300 are as follows. In step 301, a beacon packet transmitted from a selected MAC address can be captured by a sniffer. In step 302, a most recent value of approximation to starting time of an AP associated with the selected MAC address can be computed as the capture time of the beacon packet minus the TSF value in the beacon packet.

In step 303, this most recent value of approximation is compared with the stored value. Preferably, the stored value of approximation is computed from a beacon packet from the given MAC address captured by the sniffer in the past. That is, the most recent and the stored approximation values are computed using information associated with different beacon packets from the given MAC address that are captured by the sniffer. Notably, in one embodiment these different beacon packets may be transmitted by the same AP device. In an alternative embodiment, these different beacon packets can be transmitted by different AP devices, i.e., claiming the same MAC address.

Preferably, the comparison in step 303 is done within a reasonable error margin, for example 1 second or 10 seconds. For example, one approximation value is deemed smaller than another only if the former is smaller than the latter by at least the error margin.

As shown in step 304, if the most recent approximation value is found smaller than the stored value, then MAC spoofing is inferred. However, as shown in step 305, if the most recent approximation value is found greater than or equal to the stored value, then no definite inference about MAC spoofing is drawn. The stored value of the approximation is updated with the most recent value as shown in step 306. In a specific embodiment, the stored value is replaced by the most recent value.

The above sequence of steps provides a method according to an embodiment of the present invention. As shown, the method uses a combination of steps including a way of detecting MAC spoofing. Other alternatives can also be provided where steps are added, one or more steps are removed, or one or more steps are provided in a different sequence, without departing from the scope of the claims herein. For example, the TSF value can be derived from a probe response packet from a selected MAC address that is captured by the sniffer. Probe response packet may be transmitted by the AP in response to probe request packet transmitted by the sniffer or other wireless station. The probe response packet can essentially be thought of as beacon packet sent by the AP on-demand to comply with request from the sniffer or other wireless station.

In one embodiment, the steps according to the method of invention are provided within a selected sniffer device. That is, the steps according to the method of invention are performed by software, firmware, hardware or combination thereof within the sniffer device to infer MAC spoofing and generate an alert. In one embodiment, the alert is transferred to the security appliance, which in turn renders it to the system administrator. In an alternative embodiment, the alert is transferred to an indication process within the sniffer device itself. The indication process provides indication of MAC spoofing event via means such as light emitting diode (LED), text message, alarm and like. In another alternative embodiment, the alert is transferred to a prevention process. The prevention process is directed to restrict the wireless devices associated with the MAC spoofing event from engaging in wireless communication (e.g. by generating interference with their wireless transmission/reception using one or more sniffer devices).

In another embodiment of the method of invention, the sniffer transfers information associated with the captured beacon packets (e.g., source MAC address, capture time, and TSF value) to the security appliance. The security appliance computes AP starting time approximations based on this information and detects MAC spoofing. In yet another embodiment, the sniffer computes and transfers the value of AP starting time approximations to the security appliance and the security appliance detects MAC spoofing. Other alternatives and modifications are possible.

Figure 4:
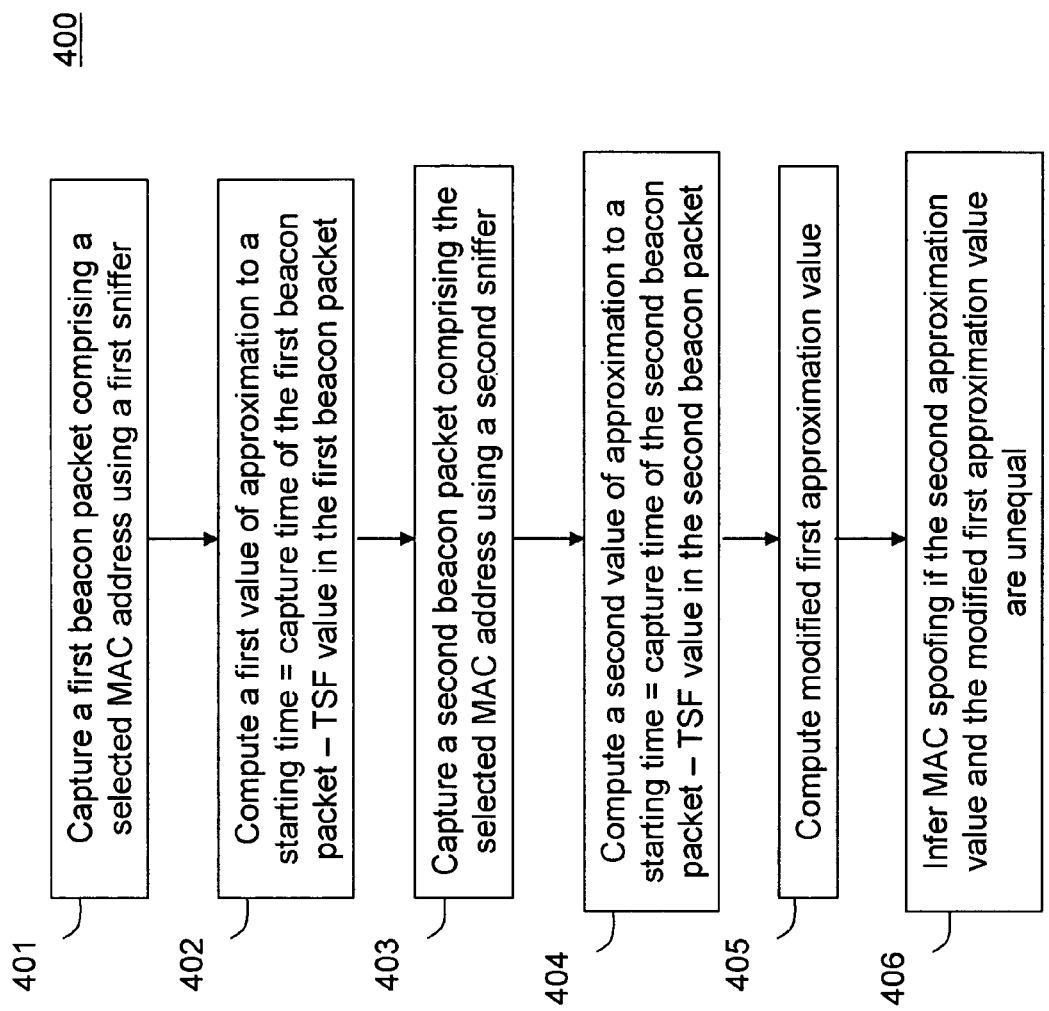
FIG. 4 illustrates a method to detect MAC spoofing in a distributed manner according to an embodiment of the present invention.

A method 400 to detect MAC spoofing according to an alternative specific embodiment of the present invention is illustrated in FIG. 4. This embodiment can be advantageously used to detect MAC spoofing, when the authorized AP and the counterfeit (i.e. masquerading) AP are within the detection range of different sniffers. For example, the authorized AP and the counterfeit AP may be so positioned (i.e., geographically, due to antenna orientations, presence of obstacles to radio signal propagation etc.) that none of the sniffers is able to listen to the beacon packets of both the APs. As merely an example, referring to FIG. 1, the authorized AP 113B may be within the detection range of sniffer 122A and not within the detection range of sniffer 122B. While the unauthorized AP 121 that masquerades as the authorized AP 113B may be within the detection range of sniffer 122B and not within the detection range of sniffer 122A.

The method 400 can also advantageously differentiate above scenario from the one where the same authorized AP is within the detection range of the two sniffers, (i.e., there actually is no counterfeit AP present). This avoids generating false positives. As merely an example, referring to FIG. 1, the authorized AP 116 may be within the detection range of both the sniffers 112A and 112B and there may not be any unauthorized AP present that masquerades the feature set of AP 116. The steps in the method 400 are as follows.

In step 401, a first sniffer captures a first beacon packet from a selected MAC address. In step 402, the first sniffer computes a first value of approximation to the starting time for the selected MAC address as the capture time of the first beacon packet minus the TSF value in the first beacon packet. The first approximation value or information derived thereof is transferred from the first sniffer to the security appliance.

In step 403, a second sniffer captures a second beacon packet from the selected MAC address. Depending upon the scenarios described before and the scanning patterns of the two sniffers, the first and the second beacon packets may or may not correspond to the same physical beacon packet transmission occurring over the wireless medium. In step 404, the second sniffer computes a second value of approximation to the starting time for the selected MAC address as the capture time of the second beacon packet minus the TSF value in the second beacon packet. The second approximation value or the information derived thereof is transferred from the second sniffer to the security appliance.

Suppose without loss of generality that the local time reference (clock) at the first sniffer is known to be behind that at the second sniffer by value denoted by 'd'. In step 405, the security appliance computes a modified first approximation value as the first approximation value reported by the first sniffer plus 'd'.

As shown in step 406, MAC spoofing is inferred if the values of the modified first approximation and the second approximation are unequal. Preferably, in order to account for factors such as imprecise knowledge of 'd' and others, MAC spoofing is inferred only if the two approximation values are apart by more than a reasonable error margin. As merely an example, MAC spoofing is inferred if these values are apart by more than 1 second (or, in another embodiment, 10 seconds). Preferably, this error margin can account for computational inaccuracies resulting from factors such as the granularity of local clock at the sniffer, the exact instant recorded by the sniffer hardware/firmware/software as the reception time, imprecise knowledge of 'd' and others.

In an alternative embodiment of method 400, each sniffer can also report its capture time of the beacon packet to the security appliance. Based on the reported capture times and the knowledge of clock offset 'd', inference can be drawn about which of the two beacon packets were transmitted on the wireless medium before another. In this embodiment, MAC spoofing is inferred only if the value of approximation computed based on the later transmitted beacon packet is smaller than the value of approximation computed based on the earlier transmitted beacon packet. In a preferred embodiment, reasonable margin of error is used in the comparison. This embodiment advantageously eliminates false positives regarding MAC spoofing that could otherwise result from an authorized AP device undergoing a reset/restart/reboot operation.

In the embodiment of method 400, preferably, information associated with difference between the local time references at the two sniffers (e.g. value of 'd') is known to the security appliance. This can be achieved in various ways including the following. The security appliance can periodically send commands to the two sniffers to report their local times to it. Both the sniffers report accordingly. The security appliance computes and stores the value of 'd' as a difference between the local times reported by the two sniffers. Preferably, the security appliance determines the time taken to complete the entire transaction, i.e., sending commands to both sniffers and receiving responses from both of them. In one embodiment, the error margin used in determining if the two approximation values are apart from each other is selected greater than the time taken to complete the entire transaction as determined by the security appliance. In an alternative embodiment, the local time reports of the sniffers are rejected by the security appliance if the time taken to complete the entire transaction exceeds a predetermined threshold value, for example, 1 second.

In yet another embodiment, the security appliance periodically sends (i.e. via broadcast, multicast or unicast) a time reference to each of the sniffers. Each of the sniffers then tunes its local clock to the received time reference from the data collection server. In yet another embodiment, to determine the time difference between the local time references at the two sniffers, the security appliance determines when the capture of the same physical packet transmission on the wireless medium is reported by the two sniffers. The security appliance then retrieves the capture times reported by the two sniffers in their respective reports and calculates the difference between them to arrive at the value of 'd'. Alternatively, protocols such at Network Time Protocol (NTP) can be used to synchronize the time references at the two sniffers.

In yet another embodiment, rather than explicitly accounting for a difference between the local time references at the two sniffers (i.e. via value of 'd'), the sniffers report to the security appliance the TSF values in the beacon packets that they capture. The AP starting time approximations can be computed by the appliance by subtracting the reported TSF values from the local times at the appliance, that is, the times when the corresponding TSF reports were received by the appliance.

Notably, the method 400 can also be used with more than two sniffer devices. For example, when the AP starting time approximation values reported by more than two sniffers are used in inferring MAC spoofing, it is preferable to account for the different local time references at different sniffers by measuring the time shift of each sniffer's local time reference with respect to the local time at the security appliance. Other modifications and alternatives are possible and will be apparent to those of skill in the art.

Figure 5:
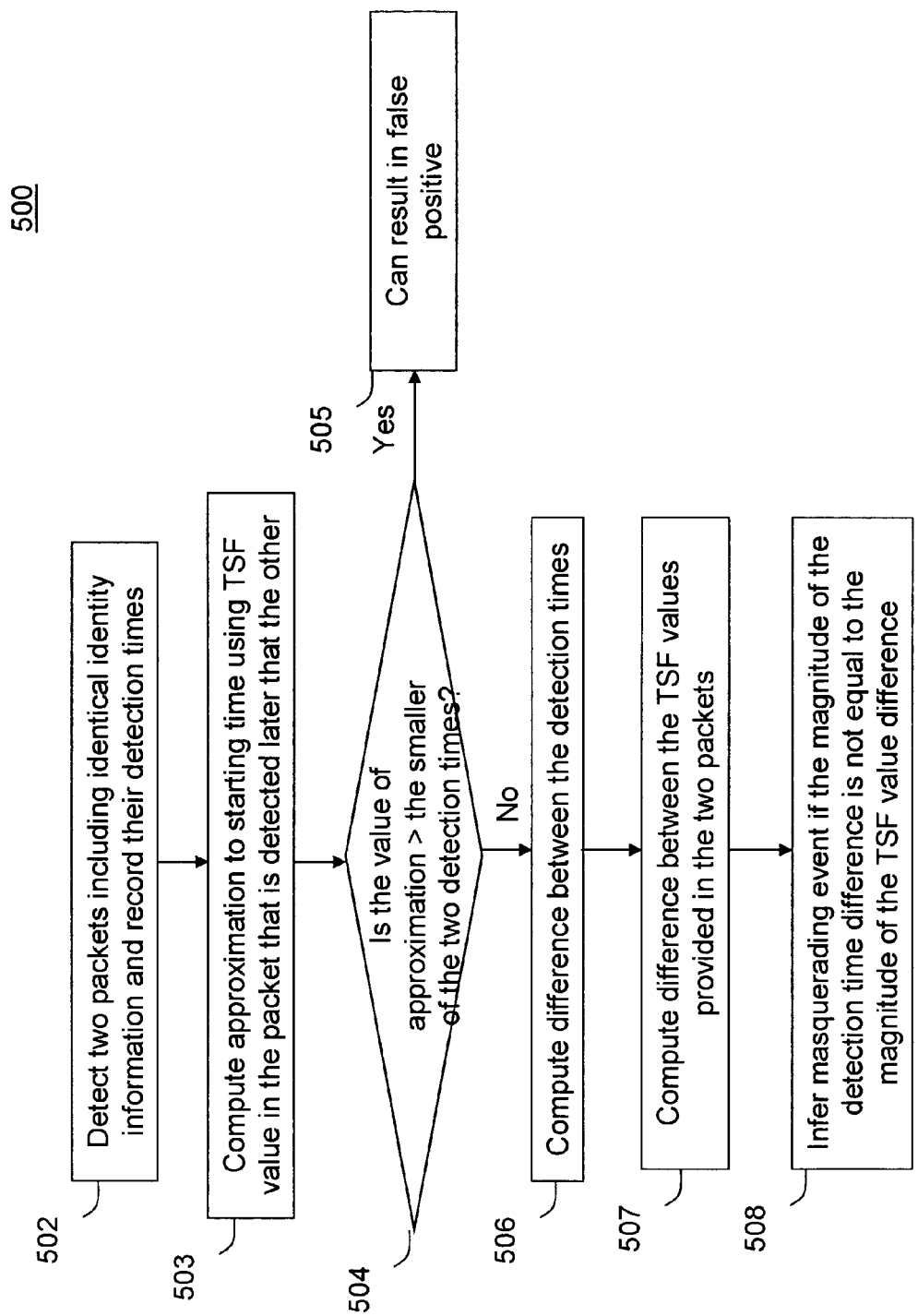
FIG. 5 illustrates a method to detect MAC spoofing according to an alternative embodiment of the present invention.

An alternative method 500 to detect a masquerading event according to another embodiment of the present invention is illustrated in FIG. 5. As shown, step 502 can detect two packets, including identical identity information, transmitted over the wireless medium. For example, identity information can include a MAC address of a transmitter of a packet. In an alternative embodiment, identity information can include parameters in beacon packet or probe response packet. The detection times of the two packets are recorded. For example, the time instant when a packet is received at the sniffer can correspond to the detection time of that packet. This value can often be provided by sniffer hardware, firmware or software. In an embodiment where the two packets are received by two different sniffer devices, the detection times are preferably computed with respect to a common clock reference between the two sniffers.

Step 503 can compute an approximation to a starting time using TSF value in the packet that is detected later than the other. For example, in one embodiment the later detected packet is transmitted on the wireless medium after the other packet, and hence detected later than the other. The approximation can be computed as the detection time of the packet minus the TSF value observed in the packet.

Step 504 can determine if the value of the approximation to a starting time is greater than the smaller of the two detection times. If so, no definite conclusion about MAC spoofing is drawn as it could result in false positive. This is shown by step 505.

On the other hand, as shown in step 506, if the approximation value is no greater than the smaller of the two detection times, a difference between the two detection times (e.g. recorded in step 502) is computed. As shown in step 507, a difference between the TSF values in the two packets is also computed. Step 508 can determine whether wireless devices having identical identity information represent a single physical wireless device (i.e. MAC spoofing). If the magnitude (i.e. absolute value) of the detection time difference is not equal to the magnitude of the TSF value difference, MAC spoofing is inferred. Preferably the two magnitudes are different by more than a reasonable error margin.

The above sequence of steps provides a method according to an embodiment of the present invention. As shown, the method uses a combination of steps including a way of detecting MAC spoofing. Other alternatives can also be provided where steps are added, one or more steps are removed, or one or more steps are provided in a different sequence, without departing from the scope of the claims herein.

For example, in an alternative embodiment of method 500, steps 503, 504, 505 can be omitted. However, this can generate false positive on MAC spoofing when an authorized AP device undergoes reset/reboot/restart operation between the two detection times. In order to eliminate such false positives in this embodiment, a masquerading event is inferred only if the two magnitudes are different for more than a threshold (e.g. 2 or 5) number of packet pairs selected from a set of packets detected during a predetermined time interval.

In yet an alternative embodiment of method 500, steps 503, 504, and 505 can be omitted. In order to avoid false positive regarding MAC spoofing, in this embodiment MAC spoofing is inferred in step 508 only if a backward detection time difference (i.e. larger−smaller) is smaller than a backward TSF value difference (i.e. later detected−earlier detected). Here, for the sake of comparison the TSF value difference is considered along with its sign, e.g. positive or negative (unlike absolute value in one of the earlier embodiments). Preferably, the backward detection time difference is smaller than the backward TSF value difference by at least a reasonable error margin.

Figure 6:
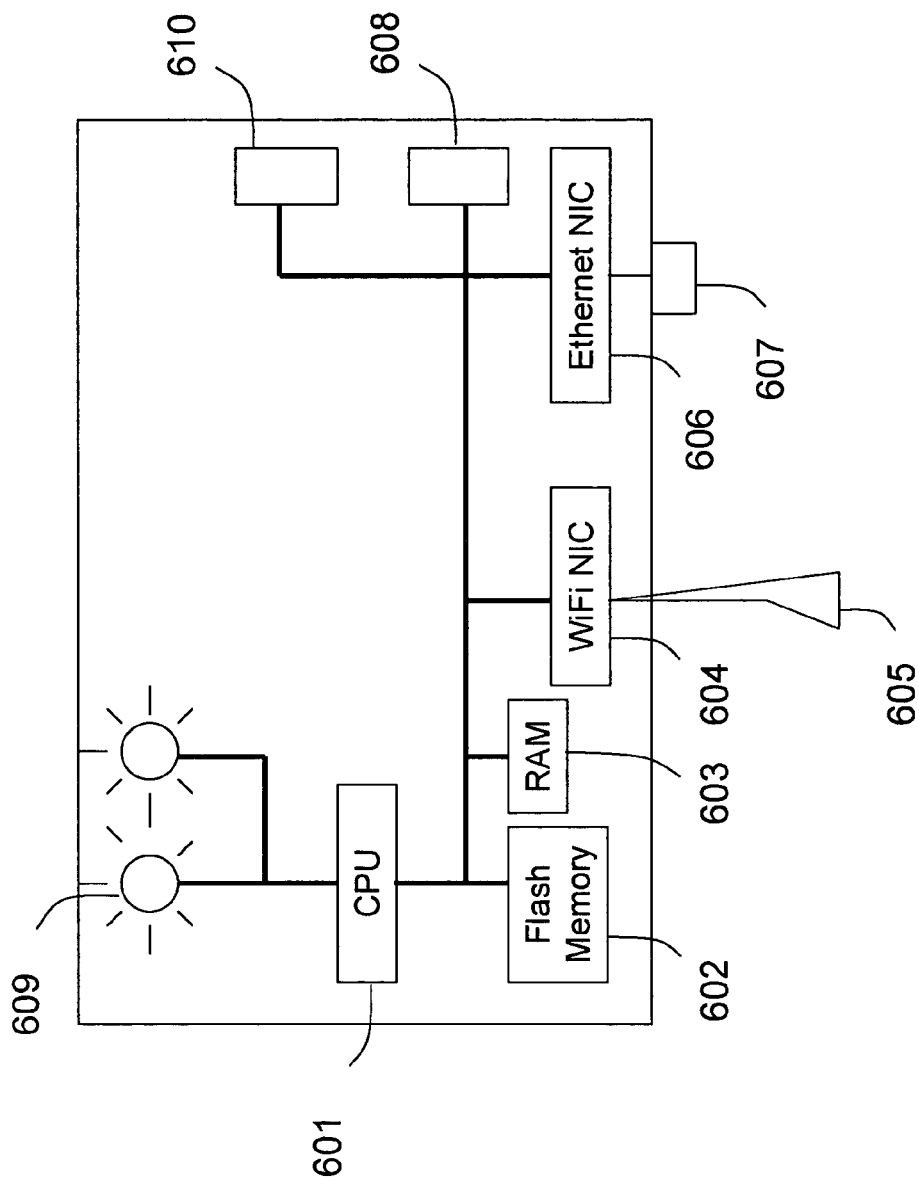
FIG. 6 illustrates a hardware diagram of a sniffer device according to an embodiment of the present invention.

An exemplary hardware diagram of a sniffer 600 is shown in FIG. 6. This diagram is merely an example, which should not unduly limit the scope of the claims herein. One of ordinary skill in the art would recognize many variations, alternatives, and modifications. As shown, in order to provide the desired detection and recording functionality, sniffer 600 can have a processor 601, a flash memory 602 where the software code for sniffer functionality resides, a RAM 603 which serves as volatile memory during program execution, one or more 802.11a/b/g wireless network interface cards (NICs) 604 which perform radio and wireless MAC layer functionality, one or more (i.e., for radio diversity) of dual-band (i.e., for transmission detection in both the 2.4 GHz and 5 GHz radio frequency spectrums) antennas 605 coupled to the wireless NICs, an Ethernet NIC 606 which performs Ethernet physical and MAC layer functions, an Ethernet jack 607 such as RJ-45 socket coupled to the Ethernet NIC for connecting sniffer 600 to wired LAN with optional power over Ethernet or POE, a serial port 608 which can be used to flash/configure/troubleshoot the sniffer device, and a power input 610. One or more light emitting diodes (LEDs) 609 can be provided on sniffer 600 to convey visual indications (such as device working properly, error condition, unauthorized AP alert, MAC spoofing alert, and so on).

Notably, the techniques of the present invention can also be used to identify a wireless device entity that transmits selected packets on the wireless medium associated with the LAN. As one example, the techniques can be used to determine if a "dual AP" device is present in the LAN. A dual AP device often has more than one radio interfaces (e.g. 802.11a and 802.11b). In one embodiment, the identity information (e.g. MAC address) in the beacon packets or probe response packets transmitted by multiple radio interfaces of a dual AP can be the same. The method of present invention can capture packets from a selected MAC address on different radio channels. For example, a radio channel can be identified by one or more factors including but not limited to center frequency, bandwidth, modulation scheme, and protocol. It can then determine the approximations to a starting time of a wireless device identified by the selected MAC address based on the TSF values in at least two of these packets each of which is captured on a different radio channel. If these approximations are equal to each other, it is inferred that the multiple radio interfaces that transmit these packets in fact belong to a single AP device entity (i.e., presence of dual AP is inferred).

In another embodiment, the identity information (e.g. MAC address) in the beacon packets or probe response packets transmitted by the multiple radio interfaces of a dual AP can be different from each other. The method of present invention can capture packets from at least two selected MAC addresses on different radio channels. It can then determine the approximations to starting times of wireless devices identified by the selected MAC addresses based on the TSF values in at least two of the packets each of which is captured on a different radio channel. If these approximations are equal to each other, it is inferred that the multiple radio interfaces that transmit these packets in fact belong to a single AP device entity (i.e., presence of dual AP is inferred).

The various embodiments may be implemented as part of a computer system. The computer system may include a computer, an input device, a display unit, and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for identifying physical wireless devices that transmit packets in a local area network (LAN), the method comprising:
   detecting packets transmitted in the LAN;
   determining identity information associated with the packets, each identity information associated with a packet identifying a wireless device;
   computing an approximation to a starting time of the wireless device identified by the each identity information associated with the packet, the computing including subtracting a time stamp field (TSF) value in the packet from the time instant when the packet was detected; and
   inferring presence of more than one physical wireless device having identical identity information only if
      a magnitude of a difference between the TSF values in two packets including identical identity information is different from a magnitude of a difference between time instants when the two packets were detected; and
      none of the approximations to a starting time derived from the two packets is greater than the smaller of the time instants when the two packets were detected.

2. The method of claim 1, wherein the time instants when the two packets were detected are recorded with respect to a common clock reference.

3. A system for monitoring wireless access point devices, the system comprising:
   one or more wireless communication interfaces;
   a processor unit; and
   a computer readable medium having stored thereon instructions for instructing the processor unit to:
      receive a reference value for a starting time approximation for a wireless access point device;
      receive a first 802.11 frame using a wireless communication interface among the one or more wireless communication interfaces, the first 802.11 frame including a source identity information indicative of the wireless access point device;
      receive a second 802.11 frame using a wireless communication interface among the one or more wireless communication interfaces, the second 802.11 frame including a source identity information indicative of the wireless access point device;
      compute a first approximation to most recent starting time of the wireless access point device using time stamp field (TSF) value included in the first 802.11 frame;
      compute a second approximation to most recent starting time of the wireless access point device using time stamp field (TSF) value included in the second 802.11 frame;
      determine that the first approximation is greater than the reference value for the starting time approximation for the wireless access point device by at least a first predetermined threshold;
      increment the reference value for the starting time approximation for the wireless access point device, the incrementing being responsive at least in part to the determining that the first approximation is greater than the reference value for the starting time approximation for the wireless access point device by the at least the first predetermined threshold;
      determine that the second approximation is smaller than the incremented reference value for the starting time approximation for the wireless access point device by at least a second predetermined threshold; and
      generate an indication of a masquerading wireless access point device, the generating being responsive at least in part to the determining that the second approximation is smaller than the incremented reference value for the starting time approximation for the wireless access point device by the at least the second predetermined threshold.

4. The system of claim 3 wherein the instructions to compute the first approximation to most recent starting time of the wireless access point device comprise instructions to subtract the time stamp field (TSF) value included in the first 802.11 frame from a time instant when the first 802.11 frame is indicated to be received by the wireless communication interface.

5. The system of claim 3 wherein the instructions to compute the second approximation to most recent starting time of the wireless access point device comprise instructions to subtract the time stamp field (TSF) value included in the second 802.11 frame from a time instant when the second 802.11 frame is indicated to be received by the wireless communication interface.

6. The system of claim 3 wherein the instructions to increment the reference value for the starting time approximation comprise instructions to change the reference value to the first approximation.

7. The system of claim 3 wherein the reference value is computed using a time stamp field (TSF) value included in a third 802.11 frame, the third 802.11 frame being received prior to the first and the second 802.11 frames.

8. A system for monitoring wireless access point devices, the system comprising:
   one or more wireless communication interfaces;
   a processor unit; and
   a computer readable medium having stored thereon instructions for instructing the processor unit to:
      receive a reference value for a starting time approximation for a wireless access point device;
      receive a first 802.11 frame using a wireless communication interface among the one or more wireless communication interfaces, the first 802.11 frame including a source identity information indicative of the wireless access point device;
      receive a second 802.11 frame using a wireless communication interface among the one or more wireless communication interfaces, the second 802.11 frame including a source identity information indicative of the wireless access point device;
      compute a first approximation to most recent starting time of the wireless access point device using time stamp field (TSF) value included in the first 802.11 frame;
      compute a second approximation to most recent starting time of the wireless access point device using time stamp field (TSF) value included in the second 802.11 frame;
      determine that the second approximation is smaller than the reference value for the starting time approximation for the wireless access point device by at least a second predetermined threshold;
      generate an indication of a masquerading wireless access point device responsive at least in part to the second approximation being determined to be smaller than the reference value by the at least the second predetermined threshold;

determine that the first approximation is grater than the reference value for the starting time approximation for the wireless access point device by at least a first predetermined threshold; and increment the reference value for the starting time approximation for the wireless access point device responsive at least in part to the first approximation being determined to be greater than the reference value by the at least the first predetermined threshold.

9. The system of claim 8 wherein the instructions to increment the reference value for the starting time approximation for the wireless access point device comprise instructions to increment the reference value to the first approximation.

10. The system of claim 8 wherein the second 802.11 frame is received prior to the first 802.11 frame.

11. A system for monitoring wireless access point devices, the system comprising:

one or more wireless communication interfaces;

a processor unit; and a computer readable medium having stored thereon instructions for instructing the processor unit to monitor a wireless access point device by:

receiving a first 802.11 frame using a wireless communication interface among the one or more wireless communication interfaces, the first 802.11 frame including a source identity information indicative of the wireless access point device;

receiving a second 802.11 frame later than the first 802.11 frame using a wireless communication interface among the one or more wireless communication interfaces, the second 802.11 frame including a source identity information indicative of the wireless access point device;

receiving a third 802.11 frame later than the second 802.11 frame using a wireless communication interface among the one or more wireless communication interfaces, the third 802.11 frame including a source identity information indicative of the wireless access point device;

determining that a time stamp field (TSF) value included in the second 802.11 frame is smaller than a time stamp field (TSF) value included in the first 802.11 frame;

determining that a time stamp field (TSF) value included in the third 802.11 frame is greater than a time stamp field (TSF) value included in the second 802.11 frame; and generating an indication of the third 802.11 frame being transmitted by a masquerading wireless access point device, the generating being responsive at least in part to the time stamp field (TSF) value included in the third 802.11 frame being determined to be greater than the time stamp field (TSF) value included in the second 802.11 frame.

12. The system of claim 11 wherein the instructions for determining that the time stamp field (TSF) value included in the third 802.11 frame is greater than the time stamp field (TSF) value included in the second 802.11 frame comprise instructions for determining that the time stamp field (TSF) value included in the third 802.11 frame is greater than the time stamp field (TSF) value included in the second 802.11 frame by more than a difference between a time instant when the third 802.11 frame is indicated to be received and a time instant when the second 802.11 frame is indicated to be received.

* * * * *